United States Patent

(12) United States Patent
McNew

(10) Patent No.: US 10,032,374 B2
(45) Date of Patent: Jul. 24, 2018

(54) VEHICLE SYSTEMS AND METHODS FOR PRESENTING PENETRATION METRIC INFORMATION ON A ROUTE

(71) Applicant: Toyota Motor Engineering & Manufacturing North America, Inc, Erlanger, KY (US)

(72) Inventor: John-Michael McNew, Ann Arbor, MI (US)

(73) Assignee: TOYOTA MOTOR ENGINEERING & MANUFACTURING NORTH AMERICA INC., Plano, TX (US)

( * ) Notice: Subject to any disclaimer, the term of this patent is extended or adjusted under 35 U.S.C. 154(b) by 83 days.

(21) Appl. No.: 15/210,290

(22) Filed: Jul. 14, 2016

(65) Prior Publication Data
US 2018/0018874 A1 Jan. 18, 2018

(51) Int. Cl.
*G08G 1/0967* (2006.01)
*G01C 21/20* (2006.01)
*G01C 21/26* (2006.01)
*H04L 29/08* (2006.01)
*H04W 4/00* (2018.01)
*H04W 4/80* (2018.01)
(Continued)

(52) U.S. Cl.
CPC ... *G08G 1/096741* (2013.01); *G01C 21/3461* (2013.01); *G08G 1/09675* (2013.01); *G08G 1/096716* (2013.01); *G08G 1/096775* (2013.01); *G08G 1/096791* (2013.01); *H04L 67/12* (2013.01); *H04W 4/80* (2018.02); *H04W 84/005* (2013.01); *H04W 84/18* (2013.01)

(58) Field of Classification Search
CPC ....... G08G 1/096741; G08G 1/096775; G08G 1/096716; G08G 1/09675; G08G 1/096791; H04L 67/12; H04W 84/18; H04W 84/005; H04W 4/80
See application file for complete search history.

(56) References Cited

U.S. PATENT DOCUMENTS

| 8,280,601 B2 | 10/2012 | Huang et al. |
| 2012/0229301 A1 | 9/2012 | Goodwin |
| 2015/0199902 A1 | 7/2015 | Hayee et al. |

FOREIGN PATENT DOCUMENTS

WO 2015160859 A1 10/2015

OTHER PUBLICATIONS

Tonguz, Ozan K. and Viriyasitavat, Wantanee, "Cars as roadside units: A self-organizing network solution." Carnegie Mellon University. Accessed Jan. 4, 2016.

*Primary Examiner* — Mussa A Shaawat
(74) *Attorney, Agent, or Firm* — Dinsmore & Shohl LLP

(57) ABSTRACT

Systems for presenting dedicated short range communication (DSRC) penetration metric information on route are provided. A system for DSRC presenting penetration metric information on route includes a screen, one or more processors, one or more memory modules communicatively coupled to the one or more processors, and machine readable instructions stored in the one or more memory modules. When executed by the one or more processors, the machine readable instructions may cause the system to generate at least one route between a start location and a destination, receive, from a cloud server, DSRC penetration metric information related to the at least one route, select one route among the least one route based on the DSRC penetration metric information, and display the selected route along with the DSRC penetration metric information for the selected route on the screen.

19 Claims, 7 Drawing Sheets

(51) Int. Cl.
*G01C 21/34* (2006.01)
*H04W 84/00* (2009.01)
*H04W 84/18* (2009.01)

… (US 10,032,374 B2)

VEHICLE SYSTEMS AND METHODS FOR PRESENTING PENETRATION METRIC INFORMATION ON A ROUTE

TECHNICAL FIELD

Embodiments described herein generally relate to systems for displaying penetration metric information on a certain route and, more specifically, to systems and methods for displaying estimated penetration rate of dedicated short range communication (DSRC) equipped vehicles and autonomous vehicles on a certain route.

BACKGROUND

Recently, vehicles equipped with dedicated short range communication (DSRC) functionality are increasing. DSRC is one-way or two-way short-range to medium-range wireless communication channels specifically designed for automotive use and a corresponding set of protocols and standards. Vehicles equipped with DSRC functionality communicate with other vehicles or infrastructure using a certain communication frequency (e.g., 75 MHz of spectrum in the 5.9 GHz band in the United States).

A vehicle equipped by DSRC and surrounded by many vehicles equipped with DSRC functionality may have an increased awareness of the environment compared to a vehicle surrounded by few vehicles equipped with DSRC functionality. Accordingly, a driver or an autonomous vehicle may prefer driving on a route on which many vehicles equipped with DSRC technology are driving.

SUMMARY

In one embodiment, systems for presenting DSRC penetration metric information on route are provided. A system for presenting DSRC penetration metric information on route includes a screen, one or more processors, one or more memory modules communicatively coupled to the one or more processors, and machine readable instructions stored in the one or more memory modules. When executed by the one or more processors, the machine readable instructions may cause the system to generate at least one route between a start location and a destination, receive, from a cloud server, DSRC penetration metric information related to the at least one route, select one route among the least one route based on the DSRC penetration metric information, and display the selected route along with the DSRC penetration metric information for the selected route on the screen.

In another embodiment, cloud servers for providing DSRC penetration metric information on a route are provided. A cloud server includes a database storing historical DSRC penetration metric information, a penetration rate estimator configured to estimate DSRC penetration metric information on a route at least based on the historical DSRC penetration metric information related to the route, and a network interface. The network interface is configured to receive the route from a vehicle, and provide the estimated DSRC penetration metric information on the route to the vehicle.

The network interface may receive information from a plurality of vehicles driving on the route in real time, and the penetration rate estimator may estimate DSRC penetration metric information further based on the information from the plurality of vehicles. The cloud server may receive traffic information on the route in real time, and the penetration rate estimator may estimate DSRC penetration metric information further based on the traffic information. The information from a plurality of vehicles may include information on whether or not the vehicle has vehicle-to-vehicle communication functionality. In addition, the information from a plurality of vehicles may include information on whether or not the vehicle is driving in an autonomous mode. Further, the information from a plurality of vehicles includes location information on the plurality of vehicles. The vehicle-to-vehicle communication functionality may include DSRC functionality. The network interface is further configured to receive information from a plurality of vehicles through vehicle-to-infrastructure (V2I) communication. The penetration rate estimator may divide the route into one or more segments based on the historical DSRC penetration metric information and estimate DSRC penetration metric information on the one or more segments.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 2:
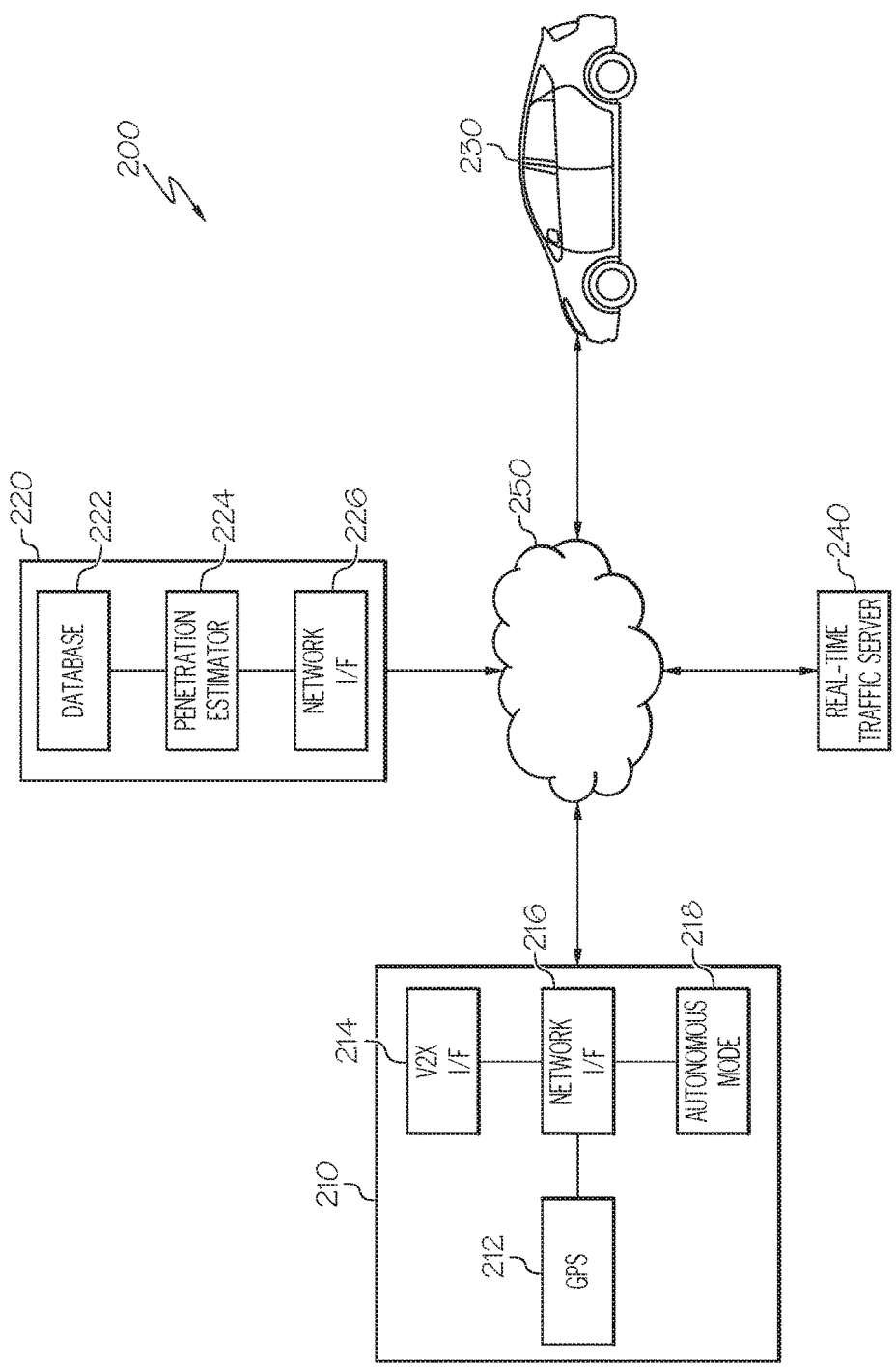
FIG. 2 schematically depicts a block diagram of communication system for communicating penetration metric information.

The embodiments disclosed herein include systems for presenting penetration metric information on route based on collected information from vehicles driving on that route. Referring generally to FIG. 2, the cloud server communicates with vehicles equipped with DSRC functionality that drive on roadways and estimates DSRC penetration metric information such as DSRC penetration rate on those roadways. When the vehicle system receives a start location and a destination, the vehicle system generates several route options. Then, the vehicle system selects a route with highest penetration rates and displays the selected route on a display of a vehicle. This may help a driver or an autonomous vehicle to choose route options with higher DSRC penetration rates. With high DSRC penetration rates, a vehicle can drive using various vehicle-to-vehicle applications. The various systems for presenting penetration metric information on routes based on collected information from vehicles driving on the routes will be described in more detail herein with specific reference to the corresponding drawings.

Figure 1:
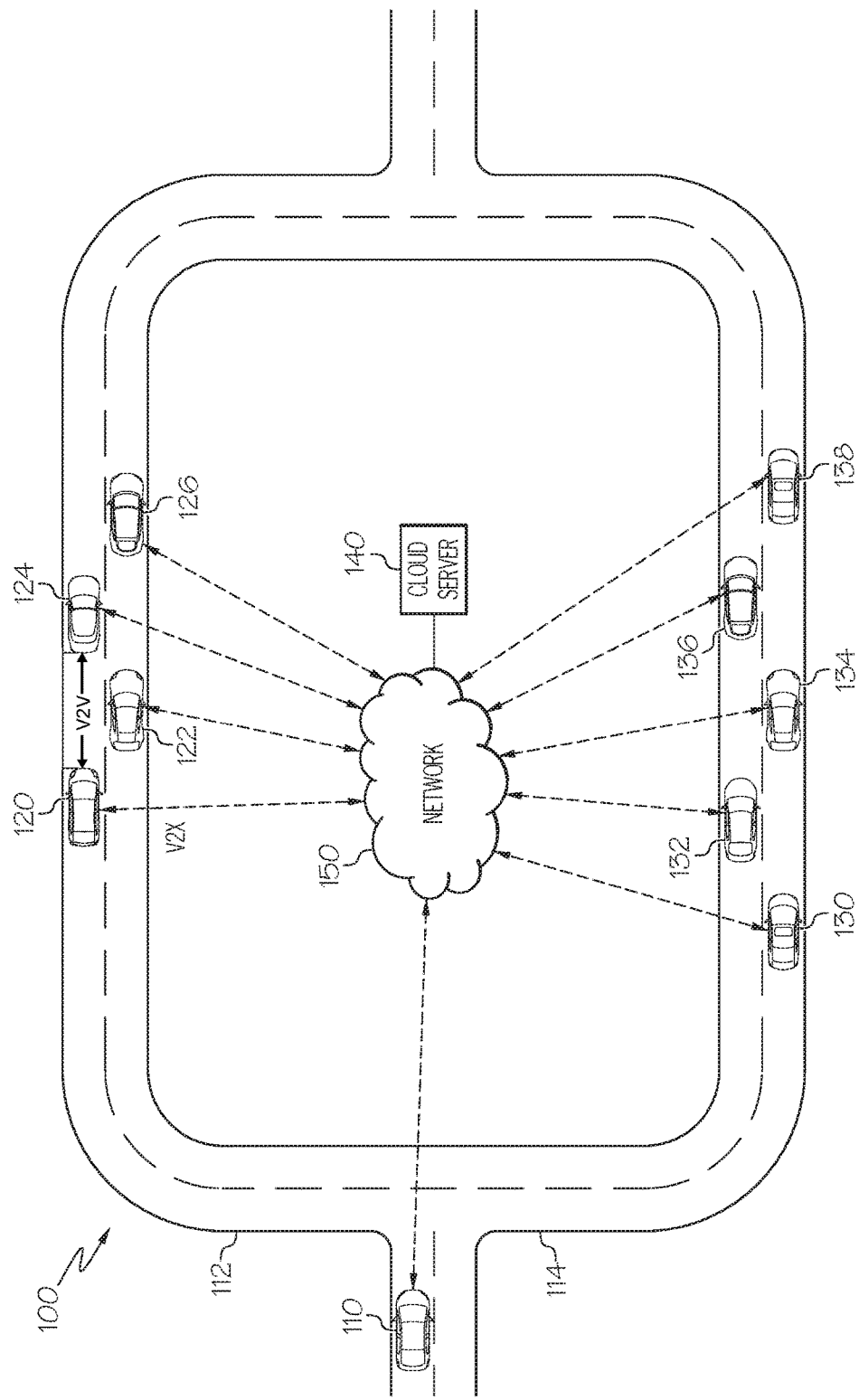
FIG. 1 schematically depicts a system providing penetration metric information to a vehicle according to one or more embodiments shown and described herein.

FIG. 1 schematically depicts a system providing penetration metric information to a vehicle according to one or more embodiments shown and described herein. The system 100 includes a vehicle 110, a first route 112, a second route 114, a plurality of vehicles 120, 122, 124, 126 on the first route 112, a plurality of vehicles 130, 132, 134, 136, 138 on the second route, a cloud server 140 and a network 150. Some of the vehicles on the first route 112 and the second route 114 may communicate with each other using vehicle-to-vehicle (V2V) communication. For example, the vehicle 120 and the vehicle 124 may communicate with each other using V2V communication. The vehicle 120 may broadcast messages, and the vehicle 124 may receive broadcast messages from the vehicle 120. These messages are not directed to any specific vehicle, but are meant to be shared with a vehicle population to support a V2V application. Vehicles may use dedicated short range communication (DSRC) for V2V communication.

The vehicles 120, 122, 124, 126 and the vehicles 130, 132, 134, 136, 138 wirelessly communicate with the cloud server 140 through the network 150. In one embodiment, the vehicles 120, 122, 124, 126 and the vehicles 130, 132, 134, 136, 138 may transmit to the cloud server 140 their location information along with route information, information on whether they are DSRC equipped vehicles, and information on whether they are driving autonomously. For example, some of the vehicles 120, 122, 124, 126, 130, 132, 134, 136, and 138 may communicate with the network 150 using vehicle-to-infrastructure (V2I) or vehicle-to-external (V2X) communication to provide information that those vehicles are equipped with DSRC functionality and information that those vehicles are driving autonomously. The DSRC equipped vehicle and the vehicles that are driving autonomously may be any type of vehicle including, but not limited to, cars, trucks, motorcycles, busses, boats, airplanes, helicopters, lawnmower, recreational vehicles, amusement park vehicles, trams, golf carts, trains, and trolleys. The autonomous vehicle can refer to a fully autonomous vehicle, semi or partially autonomous vehicle and vehicles equipped with a various advanced driver assist system (ADAS) such as adaptive cruise control and lane departure alert.

The vehicle 110 may receive penetration metric information on the first route 112 or the second route 114 from the cloud server 140. In one embodiment, the penetration metric information may include a penetration rate on the first route 112 or the second route 114. The penetration rate is the percentage of vehicles on a certain route that have DSRC functionality. For example, if 100 vehicles are driving on the first route 112 and 60 out of the 100 vehicles have DSRC functionality, the penetration rate would be 60 percent. In some embodiments, the penetration metric information may also include an autonomous vehicle rate. The autonomous vehicle rate is the percentage of vehicles that are driving autonomously. For example, if 100 vehicles are driving on the first route 112 and 10 out of the 100 vehicles are driving autonomously, the autonomous vehicle rate would be 10 percent. Based on the received penetration metric information, a driver of the vehicle or the vehicle itself may choose a route with higher penetration rate.

FIG. 2 schematically depicts a block diagram of communication system for communicating penetration metric information. The communication system 200 may include a first vehicle 210, a cloud server 220, a second vehicle 230, a real-time traffic server 240, and a network 250. The first vehicle 210 may correspond to one of the vehicles 120, 122, 124, 126, 130, 132, 134, 136, and 138 in FIG. 1. The second vehicle 230 may correspond to the vehicle 110 in FIG. 1.

The first vehicle 210 may be a vehicle equipped with DSRC functionality and include a satellite antenna 212, a vehicle-to-vehicle communication interface 214, a network interface 216, and an autonomous mode indicator 218. The satellite antenna 212 is configured to receive signals from global positioning system satellites. Specifically, in one embodiment, the satellite antenna 212 includes one or more conductive elements that interact with electromagnetic signals transmitted by global positioning system satellites. The received signal is transformed into a data signal indicative of the location (e.g., latitude and longitude) of the satellite antenna 212 or an object positioned near the satellite antenna 212.

The vehicle-to-vehicle communication interface 214 may communicate with other vehicles in the vicinity using DSRC. The first vehicle 210 may include a DSRC sensor to enable communication with other vehicles equipped with DSRC functionality. The network interface 216 may communicate with the cloud server 220 through the network 250. For example, the network interface 216 may provide to the cloud server 220 location information received from the satellite antenna 212, information that the first vehicle 210 has DSRC functionality based on the signal from vehicle-to-vehicle communication interface 214, and information that the first vehicle 210 is driving autonomously based on a signal from the autonomous mode indicator 218. The autonomous mode indicator 218 may generate a signal whether or not the first vehicle 210 is driving autonomously. In some embodiments, the first vehicle 210 may send DSRC signal to the cloud server 220 through then network 250 so that the cloud server 220 may determine that the first vehicle 210 is equipped with DSRC functionality.

The cloud server 220 may include a database 222, a penetration estimator 224, and a network interface 226. The database 222 may include historical penetration metric information in association with route and/or time. The historical penetration metric information may be generated based on information received from vehicles on a certain route at a certain time. For example, the cloud server 220 may receive information on DSRC functionality of vehicles on the first route 112 between 8 AM and 5 PM on Monday, and calculate penetration rates based on the received information. The database 222 may store penetration rates for the first route 112 and the second route 114 in FIG. 1 as shown in the table 1 below.

TABLE 1

| Route | Penetration rate | Time |
| --- | --- | --- |
| First Route | 60% | 8 AM-5 PM, Monday through Friday |
| First Route | 70% | 5 PM-10 PM, Monday through Friday |
| First Route | 50% | 8 AM-5 PM, Saturday |
| First Route | 45% | 8 AM-5 PM, Sunday |
| ... | ... | ... |
| Second Route | 30% | 8 AM-5 PM, Monday through Friday |
| ... | ... | ... |

Similarly, the database 222 may store autonomous vehicle rates for the first route 112 and the second route 114 in FIG. 1 as shown in the table 2 below.

TABLE 2

| Route | Autonomous vehicle rate | Time |
|---|---|---|
| First Route | 18% | 8 AM-5 PM, Monday through Friday |
| First Route | 6% | 5 PM-10 PM, Monday through Friday |
| First Route | 5% | 8 AM-5 PM, Saturday |
| First Route | 2% | 8 AM-5 PM, Sunday |
| ... | ... | ... |
| Second Route | 15% | 8 AM-5 PM, Monday through Friday |
| ... | ... | ... |

The penetration estimator 224 may estimate penetration metric information for a route based on historical penetration metric information stored in the database 222. For example, when the cloud server 220 receives a message from the second vehicle 230 requesting for penetration metric information on the first route 112 on Monday 9 AM, the penetration estimator 224 searches the database 222 for historical penetration metric information, which indicates 60% of penetration rate.

The penetration estimator 224 may utilize real-time communication from vehicles equipped with DSRC in estimating penetration information. For example, the vehicles on the first route 112 and the second route 114 communicate information about their DSRC capability to the cloud server 220 through the network 250 in real time, and the penetration estimator 224 updates current penetration metric information on the first route 112 and the second route 114 based on the received information from the vehicles. The database 222 may store the updated penetration metric information in real time.

The network interface 226 may communicate with the network 250. The network interface 226 may receive information from vehicles and forward the information to the penetration estimator 224. The network interface 226 may send the estimated penetration metric information to the second vehicle 230 through the network 250. The details of the second vehicle 230 will be described in detail with reference to FIG. 3.

The real-time traffic server 240 collects real-time traffic information from vehicles using wireless communication and stores and provides the real-time traffic information to the second vehicle 230 through the network. The second vehicle 230 may display the real-time traffic information on its display screen based on the information received from the real-time traffic server 240. The penetration estimator 224 may utilize the real-time traffic information in estimating penetration metric information.

The network 250 may include one or more computer networks (e.g., a personal area network, a local area network, or a wide area network), cellular networks, satellite networks and/or a global positioning system and combinations thereof. Suitable local area networks may include wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Figure 3:
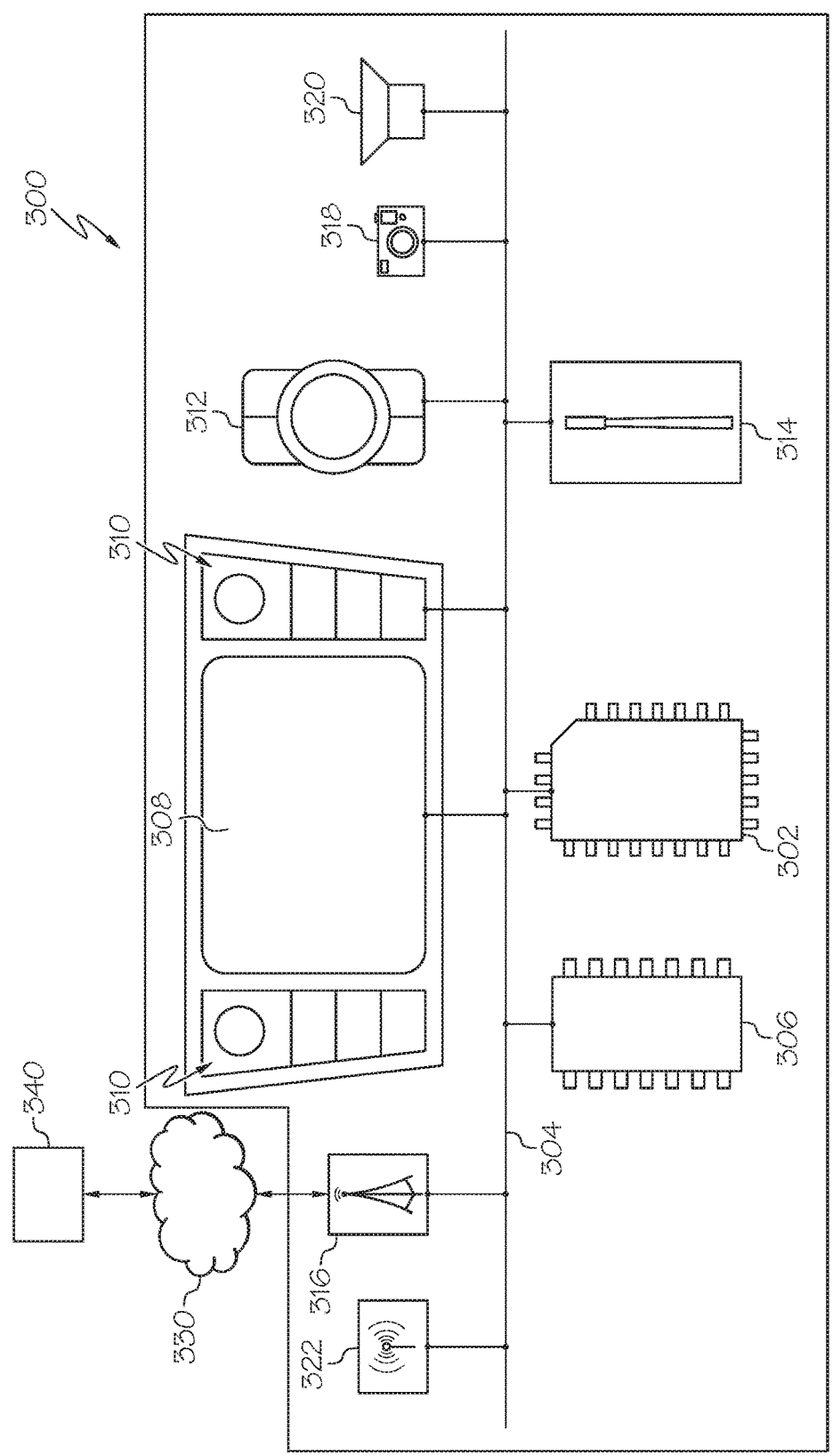
FIG. 3 schematically depicts a system, according to one or more embodiments shown and described herein.

Referring now to FIG. 3, an embodiment of a vehicle system 300 is schematically depicted. The first vehicle 210 and the second vehicle 230 shown in FIG. 2 may have similar system as the vehicle system 300. It is noted that, while the vehicle system 300 is depicted in isolation, the vehicle system 300 may be included within a vehicle in some embodiments. In embodiments in which the vehicle system 300 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input. In some embodiments, the system may be embedded within a mobile device (e.g., smartphone, laptop computer, etc.) carried by a driver of the vehicle.

The vehicle system 300 includes one or more processors 302. Each of the one or more processors 302 may be any device capable of executing machine readable instructions. Accordingly, each of the one or more processors 302 may be a controller, an integrated circuit, a microchip, a computer, or any other computing device. The one or more processors 302 are coupled to a communication path 304 that provides signal interconnectivity between various modules of the system. Accordingly, the communication path 304 may communicatively couple any number of processors 302 with one another, and allow the modules coupled to the communication path 304 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 304 may be formed from any medium that is capable of transmitting a signal such as, for example, conductive wires, conductive traces, optical waveguides, or the like. In some embodiments, the communication path 304 may facilitate the transmission of wireless signals, such as WiFi, Bluetooth, and the like. Moreover, the communication path 304 may be formed from a combination of mediums capable of transmitting signals. In one embodiment, the communication path 304 comprises a combination of conductive traces, conductive wires, connectors, and buses that cooperate to permit the transmission of electrical data signals to components such as processors, memories, sensors, input devices, output devices, and communication devices. Accordingly, the communication path 304 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 300 includes one or more memory modules 306 coupled to the communication path 304. The one or more memory modules 306 may comprise RAM, ROM, flash memories, hard drives, or any device capable of storing machine readable instructions such that the machine readable instructions can be accessed by the one or more processors 302. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 306. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In some embodiments, the one or more memory modules 306 may include a database that includes navigation information and/or map information. However, it should be understood that other embodiments may not include navigation information and/or map information.

Referring still to FIG. 3, the vehicle system 300 comprises a display 308 for providing visual output such as, for example, maps, navigation, entertainment, penetration metric information, or a combination thereof. The display 308 is coupled to the communication path 304. Accordingly, the communication path 304 communicatively couples the display 308 to other modules of the vehicle system 300. The display 308 may include any medium capable of transmitting an optical output such as, for example, a cathode ray tube, light emitting diodes, a liquid crystal display, a plasma display, or the like. Moreover, the display 308 may be a touchscreen that, in addition to providing optical information, detects the presence and location of a tactile input upon a surface of or adjacent to the display. Accordingly, each display may receive mechanical input directly upon the optical output provided by the display. Additionally, it is noted that the display 308 can include at least one of the one or more processors 302 and the one or memory modules 306. While the vehicle system 300 includes a display 308 in the embodiment depicted in FIG. 3, the vehicle system 300 may not include a display 308 in other embodiments.

The depicted vehicle system 300 comprises tactile input hardware 310 coupled to the communication path 304 such that the communication path 304 communicatively couples the tactile input hardware 310 to other modules of the vehicle system 300. The tactile input hardware 310 may be any device capable of transforming mechanical, optical, or electrical signals into a data signal capable of being transmitted with the communication path 304. Specifically, the tactile input hardware 310 may include any number of movable objects that each transform physical motion into a data signal that can be transmitted to over the communication path 304 such as, for example, a button, a switch, a knob, a microphone or the like. In some embodiments, the display 308 and the tactile input hardware 310 are combined as a single module and operate as an audio head unit or an infotainment system. However, it is noted, that the display 308 and the tactile input hardware 310 may be separate from one another and operate as a single module by exchanging signals via the communication path 304. While the vehicle system 300 includes tactile input hardware 310 in the embodiment depicted in FIG. 3, the vehicle system 300 may not include tactile input hardware 310 in other embodiments, such as embodiments that do not include a display 308.

The vehicle system 300 optionally comprises a peripheral tactile input 312 coupled to the communication path 304 such that the communication path 304 communicatively couples the peripheral tactile input 312 to other modules of the vehicle system 300. For example, in one embodiment, the peripheral tactile input 312 is located in a vehicle console to provide an additional location for receiving input. The peripheral tactile input 312 operates in a manner substantially similar to the tactile input hardware 310, i.e., the peripheral tactile input 312 includes movable objects and transforms motion of the movable objects into a data signal that may be transmitted over the communication path 304.

The vehicle system 300 comprises a satellite antenna 314 coupled to the communication path 304 such that the communication path 304 communicatively couples the satellite antenna 314 to other modules of the vehicle system 300. The satellite antenna 314 is configured to receive signals from global positioning system satellites. Specifically, in one embodiment, the satellite antenna 314 includes one or more conductive elements that interact with electromagnetic signals transmitted by global positioning system satellites. The received signal is transformed into a data signal indicative of the location (e.g., latitude and longitude) of the satellite antenna 314 or an object positioned near the satellite antenna 314, by the one or more processors 302. Additionally, it is noted that the satellite antenna 314 may include at least one of the one or more processors 302 and the one or memory modules 306. In some embodiments, the vehicle system 300 does not include the satellite antenna 314.

Still referring to FIG. 3, in some embodiments, the vehicle system 300 may be communicatively coupled to a cloud server 340 (e.g., cloud server 340 as shown in FIG. 2) by a network 330. The network 330 may correspond to the network 250 shown in FIG. 2. In one embodiment, the network 330 may include one or more computer networks (e.g., a personal area network, a local area network, or a wide area network), cellular networks, satellite networks and/or a global positioning system and combinations thereof. Accordingly, the vehicle system 300 can be communicatively coupled to the network 330 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 3, the vehicle system 300 comprises network interface hardware 316 for communicatively coupling the vehicle system 300 to the cloud server 340. The network interface hardware 316 can be communicatively coupled to the communication path 304 and can be any device capable of transmitting and/or receiving data via a network. Accordingly, the network interface hardware 316 can include a communication transceiver for sending and/or receiving any wired or wireless communication. For example, the network interface hardware 316 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 316 includes hardware configured to operate in accordance with the Bluetooth wireless communication protocol. Some embodiments may not include the network interface hardware 316.

Still referring to FIG. 3, the vehicle system 300 may further comprise a camera 318 coupled to the communication path 304 such that the communication path 304 communicatively couples the camera 318 to other modules of the vehicle system 300. The camera 318 may be any device having an array of sensing devices (e.g., pixels) capable of detecting radiation in an ultraviolet wavelength band, a visible light wavelength band, or an infrared wavelength band. The camera 318 may have any resolution. Suitable cameras may include, for example, a video camera, charge coupled device (CCD) camera, complementary metal-oxide-semiconductor (CMOS) camera, etc. Some embodiments may not include the camera 318. Some embodiments may include multiple cameras 318. The camera 318 may be able to detect a target object within a vicinity of the vehicle system 300. Further, the camera 318 may be able to determine one or more characteristics about the target object, such as, for example, the speed and direction of travel of the target object. In further embodiments, the camera 318 and/or the processor 302, based on input from the camera 318, may be able to also determine the type of object the camera 318 is capturing through image recognition capabilities. For example, the camera 318 and/or the one or more processors 302 may be able to determine whether the target object is another vehicle, a cyclist, a pedestrian, an animal, and/or a structure.

Still referring to FIG. 3, the vehicle system 300 may further comprise a speaker 320 coupled to the communication path 304 such that the communication path 304 communicatively couples the speaker 320 to other modules of the vehicle system 300. The speaker 320 transforms data signals from the vehicle system 300 into audible mechanical vibrations. The speaker 320 may provide information to an occupant of the vehicle system 300 about the target object indicative of behavior of the target object relative to the vehicle system 300. However, it should be understood that in other embodiments the system 300 may not include the speaker 320.

Still referring to FIG. 3, the system 300 may further comprise a sensor 322. The sensor 322 is coupled to the communication path 304 such that the communication path 304 communicatively couples the sensor 322 to other modules of the vehicle system 300. The sensor 322 may be any device capable of outputting a signal indicative of the speed, direction of travel, and the general proximity of the target object to the vehicle system 300. In some embodiments, the sensor 322 may include RADAR, LiDAR, or the like. As described above, any sensor or combinations of sensors may be used to detect and monitor a target object. In some embodiments, the sensor 322 may include a laser scanner, a capacitive displacement sensor, a Doppler effect sensor, an eddy-current sensor, an ultrasonic sensor, a magnetic sensor, an optical sensor, a radar sensor, a sonar sensor, or the like. Some embodiments may not include the proximity sensor 322.

Still referring to FIG. 3, the vehicle system 300 can be formed from a plurality of modular units, i.e., the display 308, tactile input hardware 310, the peripheral tactile input 312, and satellite antenna 314, can be formed as modules communicatively coupled form the vehicle system 300. Accordingly, in some embodiments, each of the modules can include at least one of the one or more processors 302 and/or the one or more memory modules 306. Accordingly, it is noted that, while specific modules may be described herein as including a processor 302 and/or a memory module 306, the embodiments described herein can be implemented with the processors 302 and memory modules 306 distributed throughout various communicatively coupled modules.

Figure 4:
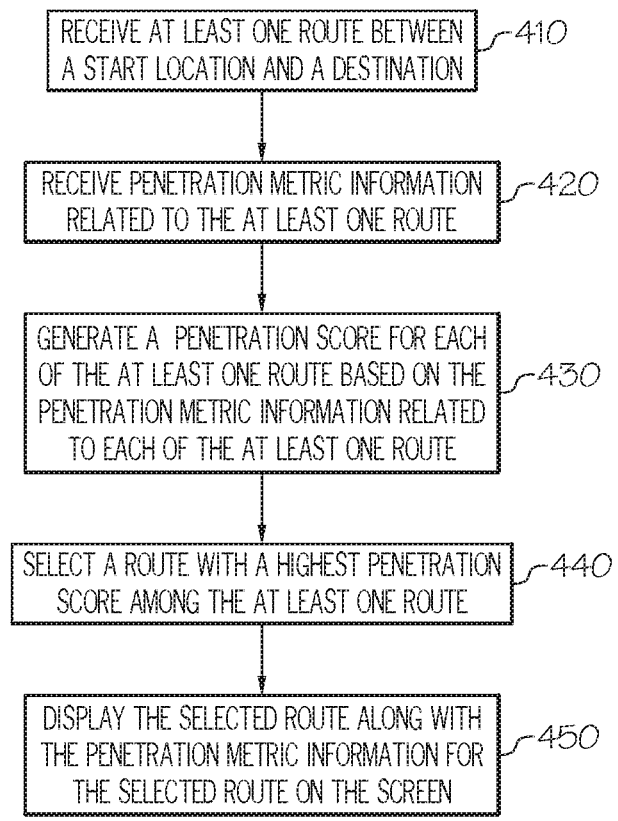
FIG. 4 depicts a flow chart of a method of displaying a route with penetration metric information on a screen of a vehicle.

FIG. 4 depicts a flow chart of a method of displaying a route with penetration metric information on a screen of a vehicle. In step 410, the vehicle system 300 generates at least one route between a start location and a destination. For example, an operation of the vehicle system inputs a start location and a destination through the peripheral tactile input 312 or the display 308. The vehicle system 300 may search possible routes between the start location and the destination based on the navigation information stored in the database 306. Then, the vehicle system 300 may select the certain number of routes based on distance and/or traffic information for the possible routes. For example, the vehicle system 300 may select three routes which are the top three shortest routes among the possible routes. In other example, the vehicle system 300 may select three routes which are the fastest routes among the possible routes based on the current traffic information received from the real-time traffic server 240. Although the example describes selecting three routes, the number of selected routes may not be limited thereto. For example, less than three or more than three routes may be selected.

In step 420, the vehicle system 300 receives penetration metric information related to the selected routes. As described above, the vehicle system 300 may receive penetration metric information for the selected routes from the cloud server 340. For example, the vehicle system 300 may receive historical penetration metric information for the selected routes stored in the cloud server 340. In addition, the vehicle system 300 may receive real-time penetration metric information for the selected routes through the network 330. The penetration metric information may include penetration rate for each of the selected routes. The penetration metric information may also include autonomous vehicle rate for each of the selected routes.

In step 430, the vehicle system 300 generates a penetration score for each of the selected routes based on the penetration metric information related to each of the selected routes. In one embodiment, the penetration score may be an overall penetration rate for a route. For example, if there are 1,000 vehicles on a first route, and 320 vehicles out of the 1,000 vehicles are equipped with DSRC, then the penetration score for the route would 32 percent. Similarly, if there are 500 vehicles on second route, and 120 vehicles out of the 500 vehicles are equipped with DSRC, then the penetration score for the second route would be 24 percent. In some embodiments, the vehicle generates a penetration score for each of the selected routes based on autonomous vehicle rate for each of the selected route. For example, if there are 1,000 vehicles on a first route, and 100 vehicles out of the 1,000 vehicles are driving autonomously, then the penetration score for the route would 10 percent. Similarly, if there are 500 vehicles on second route, and 40 vehicles out of the 500 vehicles are driving autonomously, then the penetration score for the second route would be 8 percent. In other embodiments, the penetration score may be a weighted sum of the penetration rate and the autonomous vehicle rate. Details of generating a penetration score will be described further in detail with reference to FIG. 5.

In step 440, the vehicle system 300 selects a route with the highest penetration score among the at least one route. In step 450, the vehicle system 300 displays the selected route along with the penetration metric information for the selected route on the screen of the vehicle system. The vehicle system 300 may display the route having the highest penetration score with highlight on the display and display other routes with no highlights. Details of displaying routes on the screen along with the penetration metric information will be described in detail with reference to FIGS. 6-7.

Figure 5:
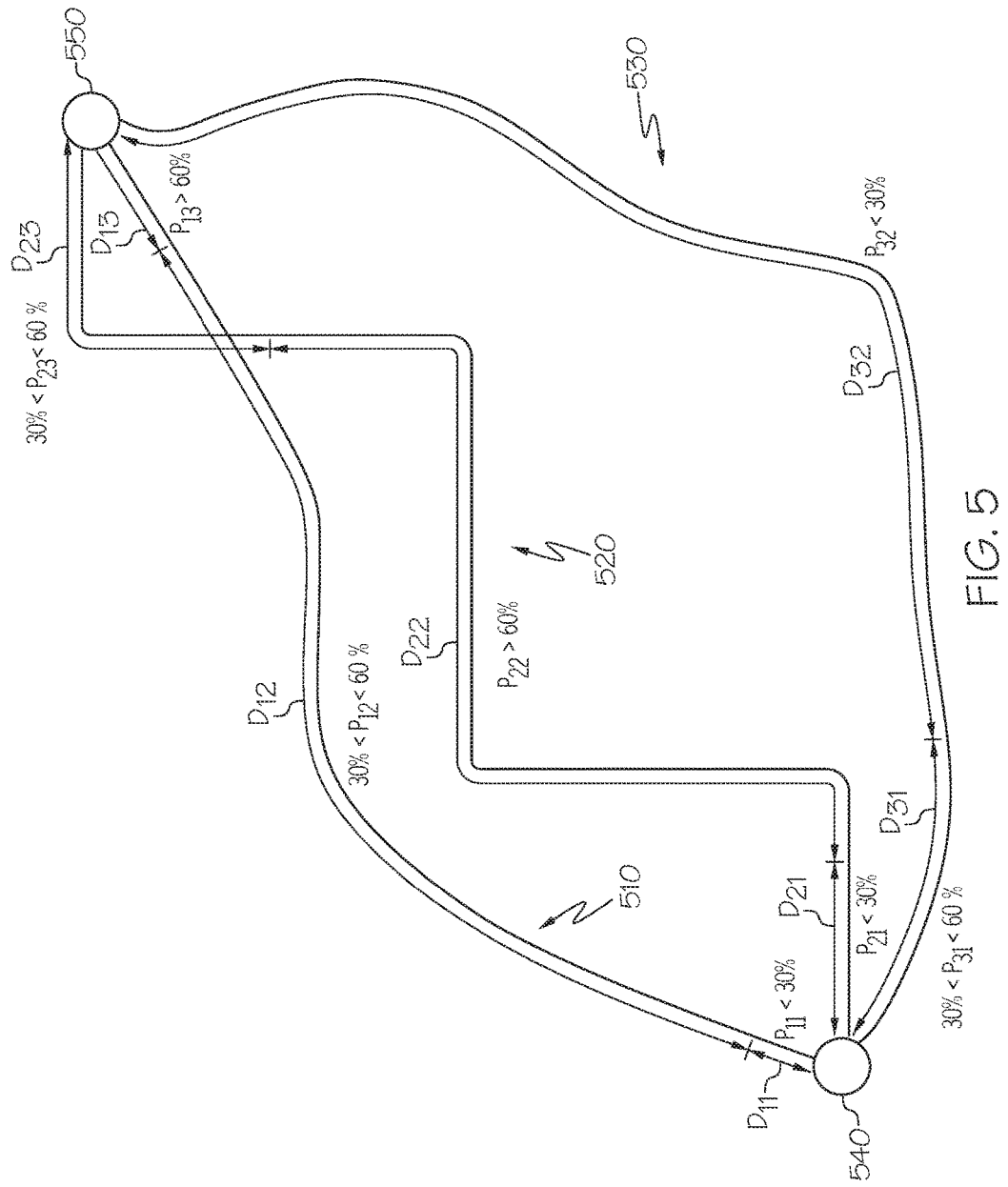
FIG. 5 describes a schematic of generating penetration metric information according to one or more embodiments shown and described herein.

FIG. 5 describes schematic of generating penetration metric information according to one or more embodiments shown and described herein. In one embodiment, the vehicle system may receive a start location 540 and a destination 550. For example, an operator of the vehicle system may input the start location 540 and the destination 550 through the tactile input hardware 310 or a touch screen on the screen 308. Three routes 510, 520 and 530 between the start location 540 and the destination 550 may be generated and selected among possible routes between the start location 540 and the destination 550. Each of the routes 510, 520 and 530 may be divided into a plurality of segments based on penetration rate corresponding to the segments. The route 510 may be divided into a segment D11, a segment D12, and a segment D13. The penetration rate P11 for the segment D11 is less than 30%. The penetration rate P12 for the segment D12 is between 30% and 60%. The penetration rate P13 for the segment D13 is less than 30%. Similarly the route 520 may be divided into a segment D21, a segment D22, a segment D23. The penetration rate P21 for the segment D21 is less than 30%. The penetration rate P22 for the segment D22 is over 60%. The penetration rate P23 for the segment D23 is between 30% and 60%. Also, the route 530 may be divided into a segment D31, and a segment D32. The penetration rate P31 for the segment D31 is between 30% and 60%. The penetration rate P32 for the segment D32 is less than 30%. Although the routes 510, 520 and 530 are divided into segments based on ranges 0% through 30%, 30% through 60%, and over 60%, any other ranges may be used for dividing the routes into segments. For example, ranges 0% through 20%, 20% through 40%, and over 40% may be used. The ranges may be customized by an operator of the vehicle system.

The vehicle system 300 may identify segments with penetration rate higher than 60% as high penetration segments, identify segments with penetration rate between 30% and 60% as medium penetration segments, and identify segments with penetration rate lower than 30% as low penetration segment. For example, the vehicle system 300 may identify the segments D11, D21, and D32 as low penetration segments, D12, D23, and D31 as medium penetration segments, and D13 and D22 as high penetration segments.

Then, the penetration score for the route 510 may be calculated using the penetration rate for each segments and the distance of each segments. For example, the penetration score for the route 510 may be a weighted sum of penetration rates for the segments D11, D12, and D13. For example, the penetration score PS1 for the route 510 may be calculated as:

$$PS1 = P11 \times \frac{D11}{(D11+D12+D13)} + P12 \times \frac{D12}{(D11+D12+D13)} + P13 \times \frac{D13}{(D11+D12+D13)}$$

Here, D11, D12, and D13 represent the length of each segment, and P11, P12, and P13 are average penetration rates for the three segments. In other example, the penetration score for the route 510 may be a percentage of segments with a penetration rate over 60% for a certain route. For example, for the route 510, the segment D13 is the only segment that has a penetration rate higher than 60%. Thus, the penetration score PS1 for the route 510 may be calculated as:

$$PS1 = \frac{D13}{(D11+D12+D13)}$$

In another example, the penetration score for the route 510 may be an overall penetration rate for the route 510 without dividing the route into segments. For example, if there are 1,000 vehicles driving on the route 510, and 260 of the 1,000 vehicles are equipped with DSRC, the penetration score would be 26%. The way of determining the penetration score is not limited to above examples, and any other algorithm may be used for determining the penetration score. In some embodiments, the cloud server 220 may generate penetration scores for the routes and send the scores to the vehicle system 300 through the network 250.

Based on the calculated penetration scores for the routes 510, 520 and 530, the route with the highest penetration score may be selected and displayed on the screen of the vehicle system. For example, the route 520 may be selected having the highest penetration score and displayed on the screen of the vehicle system, which will be described in detail below.

Figure 6:
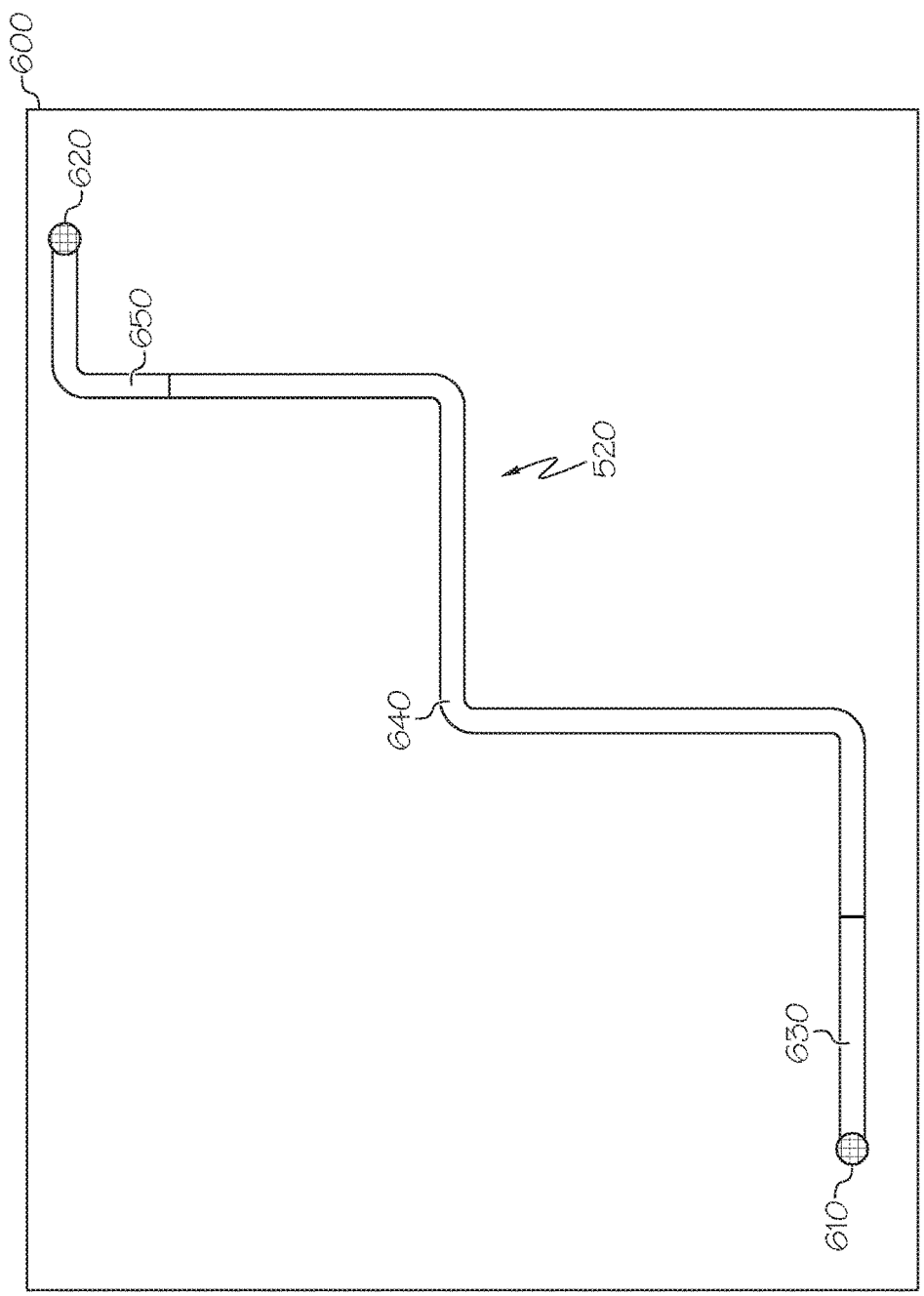
FIG. 6 schematically depicts a screen displaying a route with penetration metric information according to one or more embodiments shown and described herein.

FIG. 6 schematically depicts a screen displaying a route with penetration metric information in accordance with one embodiment of the present disclosure. The screen 600 displays a start location 610 and a destination 620. The start location 610 may correspond to the start location 540 in FIG. 5 and the destination may correspond to the destination 550 in FIG. 5. As described above with reference to FIG. 5, the route 520 is selected and displayed on the screen 600. The route 520 includes three segments 630, 640, and 650.

The penetration rate for the segment 630 is less than 30%, the penetration rate for the segment 640 is more than 60%, and the penetration rate for the segment 650 is between 30% and 60%. The segments 630, 640 and 650 may be highlighted in different colors. For example, the segment 630 may be highlighted in red which indicates a low penetration rate, the segment 640 may be highlighted in green which indicates a high penetration rate, and the segment 650 may be highlighted in yellow which indicates a medium penetration rate. In some embodiments, texts "low," "high," "medium" may be displayed next to the segments 630, 640 and 650 to indicate the degree of penetration. Although, only the route 520 is displayed on the screen 600, other routes 510 and 530 may be also displayed on the screen 600. The other routes 510 and 530 may be displayed without any highlight or text.

Figure 7:
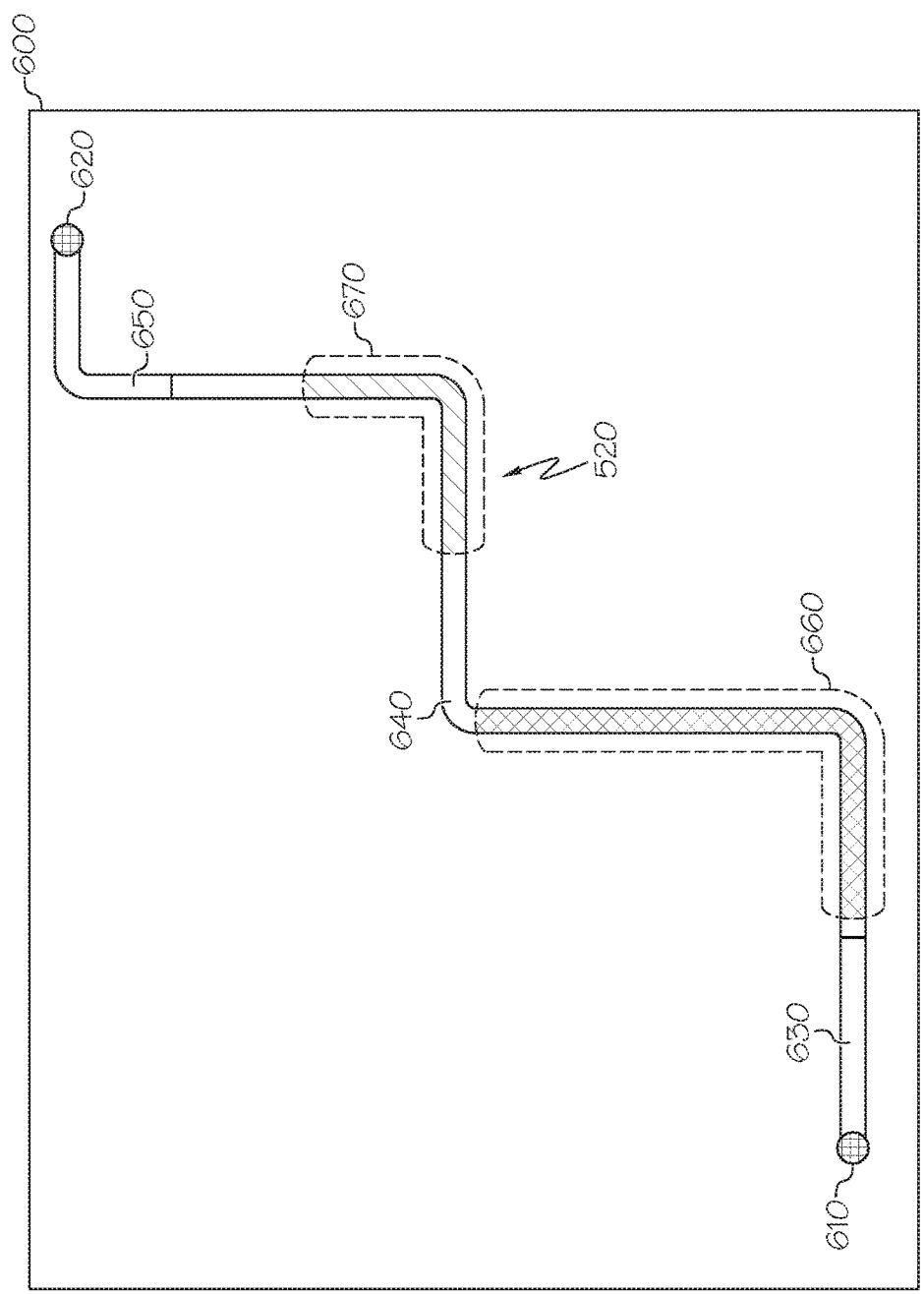
FIG. 7 schematically depicts a screen displaying a route with penetration metric information according to one or more embodiments shown and described herein.

FIG. 7 schematically depicts a screen displaying a route with penetration metric information in accordance with other embodiment of the present disclosure. Similar to FIG. 6, the screen 600 displays the start location 610, the destination 620, three segments 630, 640, 650, and the route 520. In addition to the penetration rate information which is indicated in different colors as described above with reference to FIG. 6, the screen 600 may also display autonomous vehicle rate information.

The autonomous vehicle rate information may be displayed with different fill patterns. For example, a portion 660 of the route 520 is filled with X marks and a portion 670 of the route 520 is filled with slashes (/). X marks indicate that the corresponding portions have autonomous vehicle rate of over 50%. Slashes may indicate that the corresponding portions have autonomous vehicle rate between 20% and 50%. Portions without any fill patterns may indicate that the corresponding portions have autonomous vehicle rate less than 20%. Although fill patterns are determined based on autonomous vehicle rate ranges 0% through 20%, 20% through 50%, and over 50%, any other ranges may be used for different fill patterns. For example, ranges 0 through 10%, 10% through 20%, and over 20% may be used. The ranges may be customized by an operator of the vehicle system.

According to the present disclosure, the vehicle system provides estimated DSRC penetration metric information on selected routes to a driver or an autonomous vehicle, such that the driver or the autonomous vehicle can select a route with a high penetration rate. In addition, the estimated DSRC penetration metric information is updated in real time based on information received from vehicles on the route. Accordingly, a driver or an autonomous vehicle can drive with less probability of accidents by selecting the route with a high penetration rate because the drive or the autonomous vehicle may have an increased awareness of the environment with a higher DSRC penetration rate.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle system for presenting dedicated short rage communication (DSRC) penetration metric information on routes, the system comprising:
   a screen;
   one or more processors;
   one or more memory modules communicatively coupled to the one or more processors; and
   machine readable instructions stored in the one or more memory modules that cause the vehicle system to perform at least the following when executed by the one or more processors:
     generate two or more routes between a start location and a destination;
     receive, from a cloud server, DSRC penetration metric information related to each of the two or more routes, the DSRC penetration metric information including a penetration rate for each of the two or more routes;
     select one route among the two or more routes based on the DSRC penetration metric information; and
     display the selected route along with the DSRC penetration metric information for the selected route on the screen.

2. The vehicle system of claim 1, wherein selecting one route among the two or more routes based on the DSRC penetration metric information comprises:
   calculating a penetration score for each of the two or more routes based on the DSRC penetration metric information related to each of the two or more routes; and
   selecting a route with a highest penetration score among the two or more routes.

3. The vehicle system of claim 1, wherein displaying the selected route along with the DSRC penetration metric information for the selected route on the screen comprises:
   dividing the selected route into a plurality of segments based on the penetration rate for each of the plurality of segments;
   displaying each of the plurality of segments in a predetermined color based on the penetration rate.

4. The vehicle system of claim 1, wherein displaying the selected route along with the DSRC penetration metric information for the selected route on the screen comprises:
   dividing the selected route into a plurality of segments based on the penetration rate for each of the plurality of segments;
   displaying each of the plurality of segments with a predetermined identifier based on the penetration rate.

5. The vehicle system of claim 1, wherein the DSRC penetration metric information comprises an autonomous vehicle rate.

6. The vehicle system of claim 1, wherein the DSRC penetration metric information comprises historical DSRC penetration metric information.

7. The vehicle system of claim 1, wherein the DSRC penetration metric information comprises real-time DSRC penetration metric information.

8. The vehicle system of claim 1, wherein displaying the selected route along with the DSRC penetration metric information for the selected route on the screen comprises
   displaying the selected route along with a penetration rate and an autonomous vehicle rate for the selected route.

9. The vehicle system of claim 1, wherein the penetration rate percentage comprises a percentage of vehicles equipped with DSRC.

10. A cloud server for providing DSRC penetration metric information on a route, the cloud server comprising:
    a database storing historical DSRC penetration metric information including a historical penetration rate for the route;
    a penetration rate estimator configured to estimate DSRC penetration metric information on the route at least based on the historical DSRC penetration metric information related to the route;
    a network interface configured to
      receive the route from a vehicle; and
      provide the estimated DSRC penetration metric information on the route to the vehicle,
    wherein the historical penetration rate is a historical percentage of vehicles equipped with DSRC functionality.

11. The cloud server of claim 10, wherein the network interface is further configured to receive information from a plurality of vehicles driving on the route in real time, and the penetration rate estimator is configured to estimate DSRC penetration metric information further based on the information from the plurality of vehicles.

12. The cloud server of claim 10, wherein the network interface is further configured to receive traffic information on the route in real time, and the penetration rate estimator is configured to estimate DSRC penetration metric information further based on the traffic information.

13. The cloud server of claim 11, wherein the information from a plurality of vehicles includes information on whether or not the vehicle has vehicle-to-vehicle communication functionality.

14. The cloud server of claim 13, wherein the vehicle-to-vehicle communication functionality comprises DSRC.

15. The cloud server of claim 11, wherein the information from a plurality of vehicles includes information on whether or not the vehicle is driving in an autonomous mode.

16. The cloud server of claim 11, wherein the information from a plurality of vehicles includes location information on the plurality of vehicles.

17. The cloud server of claim 11, wherein the network interface is further configured to receive information from a plurality of vehicles through vehicle-to-infrastructure (V2I) communication.

18. The cloud server of claim 11, wherein the database is updated in real time based on the information from the plurality of vehicles.

19. The cloud server of claim 10, wherein the penetration rate estimator is configured to divide the route into one or more segments based on the historical DSRC penetration metric information and estimate DSRC penetration metric information on the one or more segments.

* * * * *

UNITED STATES PATENT AND TRADEMARK OFFICE
CERTIFICATE OF CORRECTION

PATENT NO. : 10,032,374 B2
APPLICATION NO. : 15/210290
DATED : July 24, 2018
INVENTOR(S) : John-Michael McNew Page 1 of 1

It is certified that error appears in the above-identified patent and that said Letters Patent is hereby corrected as shown below:

In the Claims

In Column 13, Line 27: change "short rage" to --short range--

Signed and Sealed this
Sixth Day of November, 2018

Andrei Iancu
*Director of the United States Patent and Trademark Office*